April 21, 1925. 1,535,001

J. WEISENBURGER ET AL

ANIMAL TRAP

Filed Jan. 31, 1924 2 Sheets-Sheet 1

Inventors
John Weisenburger AND
James H. Huston,

By
Attorney

April 21, 1925.　　　　J. WEISENBURGER ET AL　　　1,535,001
ANIMAL TRAP
Filed Jan. 31, 1924　　　2 Sheets-Sheet 2
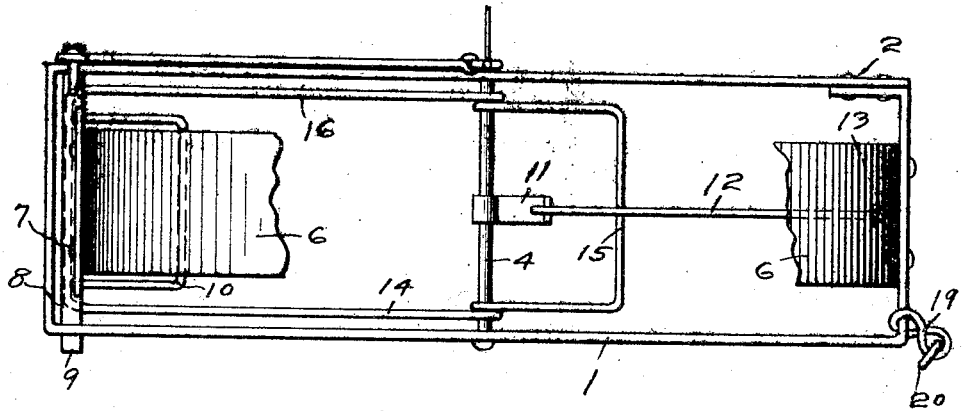
Fig. 2.
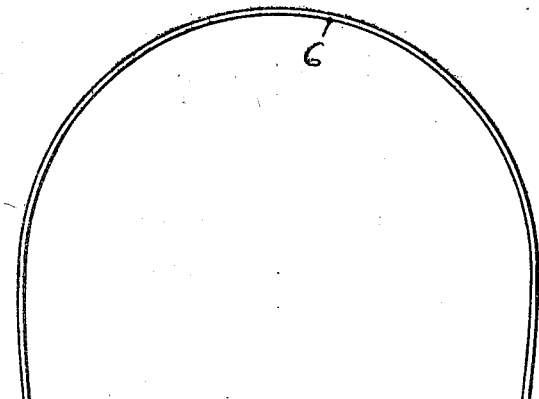
Fig. 3.
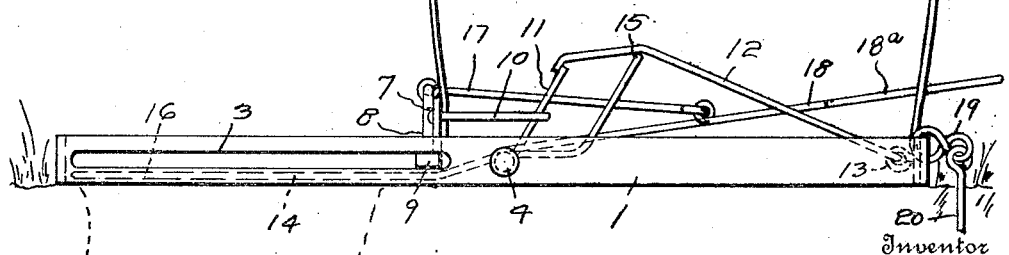
Inventor
John Weisenburger AND
James H. Huston
By
Attorney Patented Apr. 21, 1925.

1,535,001

UNITED STATES PATENT OFFICE.

JOHN WEISENBURGER AND JAMES H. HUSTON, OF ROSEBUD, SOUTH DAKOTA.

ANIMAL TRAP.

Application filed January 31, 1924. Serial No. 689,715.

*To all whom it may concern:*

Be it known that JOHN WEISENBURGER and JAMES H. HUSTON, citizens of the United States, residing at Rosebud, in the county of Todd and State of South Dakota, have invented new and useful Improvements in Animal Traps, of which the following is a specification.

The present invention has for its purpose to provide, in an animal trap especially adapted for trapping gophers and the like, a construction including a rectangular frame with parallel guides at one end for guiding the movable trap jaw carried at one end of a bowed leaf spring, in combination with means for holding the movable jaw set.

A further purpose is the provision of means comprising an actuator for releasing said jaw holding means, whereby the jaw may act to engage and clamp the animal against one end of the frame.

Still another purpose is the provision of a movable trap jaw, spring-actuated, with a loop and pair of cooperating triggers, one acting to engage with the loop and an animal-operated actuator for releasing one of said triggers which releases the other and from disengagement with the loop, allowing the movable jaw to clamp the animal in one end of the frame.

A further purpose is the provision of means for anchoring said trap in the path of a gopher or similar animal, in combination with loosely connected means for connecting the movable jaw to the frame to prevent the loss of the jaw in case the same becomes disengaged from its guides.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

In the drawings:

Figure 2 is a plan view, with the leaf spring broken away, showing the movable jaw released.

Figure 3 is a view in elevation more clearly showing the arrangement and construction of the cooperative triggers.

Figure 1:
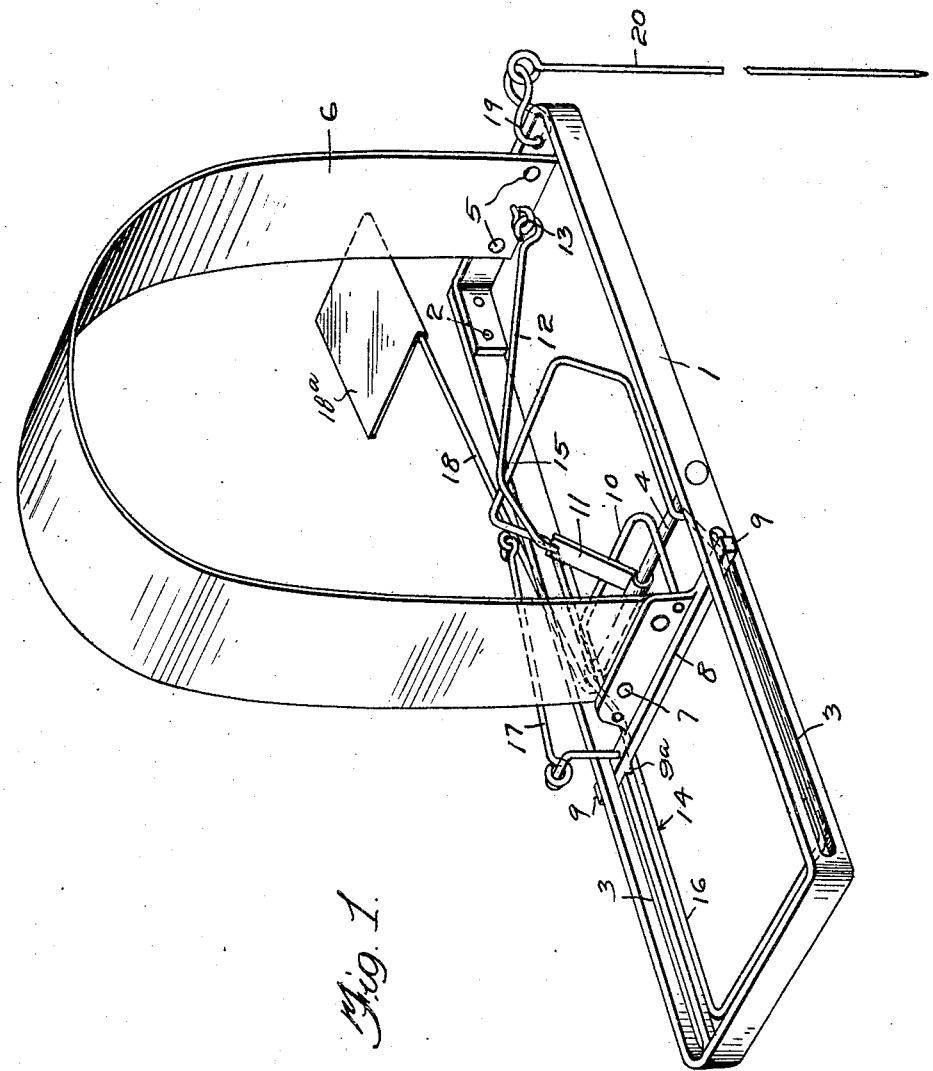
Figure 1 is a view in perspective of the improved trap constructed in accordance with the invention, showing the movable jaw set.

Referring to the drawings, 1 designates a frame which is rectangular and may be made in any suitable proportions. The frame is preferably constructed of a strip or bar of metal bent in rectangular formation, as shown, with its ends riveted, as at 2. The parallel longitudinal parts of the strip or bar have longitudinal elongated guide slots 3 and mounted in suitable bearings is a pivot pin 4.

Secured in any suitable manner, preferably by rivets, bolts or the like 5, to one end of the frame is a relatively heavy bowed leaf spring 6. This spring is bowed from its attached end to the opposite end of the frame and secured to its movable end, as at 7, is a trap jaw 8. The jaw proper is disposed in a lateral direction from its base portion and is provided with upper and lower extensions 9 which are guided in the guide slots 3. These extensions have shoulders 9ª which act to keep the extensions in engagement with the slots.

Also carried by the base of the trap jaw is a loop 10 and mounted upon the pivot pin 4 is a trigger 11 which engages through the loop and overlies the same so as to engage with a second trigger 12 which is connected to an eye 13 which is formed with the securing means which attaches the heavy leaf spring to one end of the frame.

An actuator 14 which is animal-operated is also pivotally mounted upon the pivot pin 4 and one looped end of this actuator engages with the second trigger, as shown at 15, the other looped end 16 lying within the rectangular frame substantially parallel with the guide slots. The frame is disposed so that the looped end 16 of the actuator will lie in the path of the gopher or other animal so that when the animal passes through the looped end 16, it will contact with the sides or the end, causing the other looped end to bear against the second trigger and disengage it from the first trigger which is mounted upon the pivot pin. Upon the release of the first trigger, the jaw on the end of the leaf spring will move quickly toward the end of the frame and trap the animal between the jaw and one end of the frame.

Interconnected links 17 and 18 are provided for loosely connecting the jaw carrying end of the spring to the frame of the trap. The link 8 at its extremity carries a laterally extending plate 18ª to be engaged by the hand in the resetting operation, the swinging of the link 18 on the pivot pin 4 as an axis serving to retract the jaw 8 to its set position. Attached to the ends of the frame, as at 19, are links or rods 20 which act to anchor the trap in position with the looped end of the actuator in the path of the animal so as to prevent displacement of the trap.

The invention having been set forth, what is claimed is:

1. An animal trap including a frame provided with parallel guides at one end of the frame, which end constitutes a stationary jaw, a pivot pin disposed substantially centrally of the frame, a relatively heavy bowed leaf spring having a free end and a fixed end attached to the opposite end of the frame, a movable jaw carried by the free end of the spring and adapted to cooperate with the stationary jaw to trap an animal between the two jaws, a trigger mechanism operatively and releasably connected with the movable jaw, and an animal-operated actuator for releasing an element of said trigger mechanism which results in the release of the movable jaw.

2. An animal trap including a frame provided with parallel guides at one end of the frame, which end constitutes a stationary jaw, a pivot pin disposed substantially centrally of the frame, a relatively heavy bowed leaf spring having a free end and a fixed end attached to the opposite end of the frame, a movable jaw carried by the free end of the spring and adapted to cooperate with the stationary jaw to trap an animal between the two jaws, a trigger mechanism operatively and releasably connected with the movable jaw, an animal-operated actuator for releasing an element of said trigger mechanism which results in the release of the movable jaw, and means to prevent displacement of the movable jaw from the parallel guides.

3. An animal trap including a frame having one end thereof constituting a stationary jaw and provided with parallel guides, a bowed leaf spring with one end fixed to the opposite end of the frame and having a free end, a movable jaw attached to the free end of the spring and mounted in said guides, a loop carried by the movable jaw, a pivot pin mounted in the frame, a trigger mounted on the pin and engaging said loop, a second trigger engaging the first trigger, an animal-operated actuator mounted upon the pin and having a looped end assuming a position within the guide carrying end of the frame, said actuator having means to operatively engage with the second trigger whereby, upon pivotal movement of the actuator, the second trigger releases the first trigger which, in turn, releases the loop and allows the movable jaw to cooperate with the stationary jaw to trap an animal therebetween.

4. An animal trap including a frame having one end thereof constituting a stationary jaw and provided with parallel guides, a bowed leaf spring with one end fixed to the opposite end of the frame and having a free end, a movable jaw attached to the free end of the spring and mounted in said guides, a loop carried by the movable jaw, a pivot pin mounted in the frame, a trigger mounted on the pin and engaging said loop, a second trigger engaging the first trigger, an animal-operated actuator mounted upon the pin and having a looped end assuming a position within the guide carrying end of the frame, said actuator having means to operatively engage with the second trigger whereby, upon pivotal movement of the actuator, the second trigger releases the first trigger which, in turn, releases the loop and allows the movable jaw to cooperate with the stationary jaw to trap an animal therebetween, and means upon the movable jaw cooperating with the upper and lower parts of the frame to prevent displacement of the movable jaw from the guides.

In testimony whereof they affix their signatures.

JOHN WEISENBURGER.
JAMES H. HUSTON.